United States Patent Office 3,010,282
Patented Nov. 28, 1961

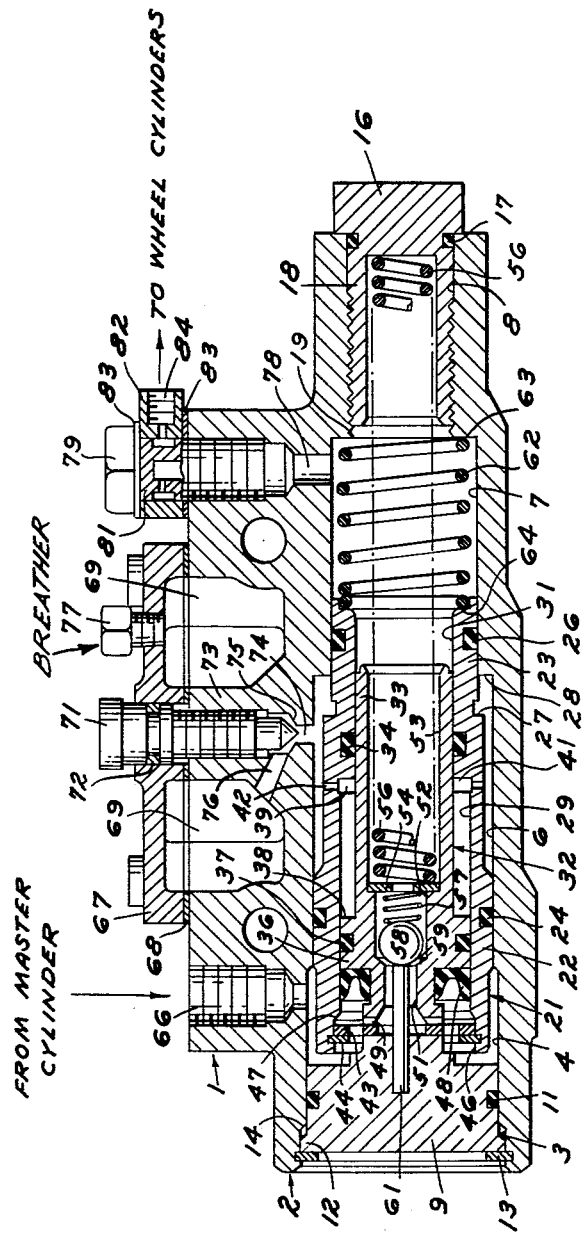

3,010,282
PRESSURE CONVERTING APPARATUS
FOR FLUID SYSTEMS
Axel J. Jansson, Detroit, Mich., assignor to Hydroease Corporation, Detroit, Mich., a corporation of Michigan
Filed June 29, 1960, Ser. No. 39,553
14 Claims. (Cl. 60—54.5)

This invention relates to pressure converting apparatus for fluid systems and more particularly to a booster assembly for use in a hydraulic brake system.

In many hydraulic brake systems, a pump unit, such as a master cylinder, is operated by a brake pedal or other control which advances a plunger in the compression chamber of the master cylinder, thereby delivering pressure fluid through brake lines connected to remote motor cylinders which, when thus actuated, drive brake shoes against the brake drums. Due to the clearance which must be provided between the shoes and the drums, and the normal increase in such clearance as brake linings wear, it is well recognized that the volumetric capacity of the master cylinder must be relatively large. This factor places a practical limit on the degree of pressure multiplication which can be achieved by varying the ratio between master and wheel cylinder diameters. In order to obtain both high pressure and large volume, booster cylinders have been proposed which operate in conjunction with the master cylinder to produce a high pressure after the master cylinder has delivered a large volume of fluid at a much lower pressure.

However, such booster systems are often unduly complex and expensive, some requiring a plurality of valves to control a variety of fluid passages which, if internal, are often difficult to cast or machine, and if external, require pressure connections and exposed fluid lines. Other prior art booster systems convert from low to high pressure in only one stage, thereby reducing the operator's control over his vehicle because of the sudden change in pressure conversion. Since adding a booster cylinder increases the cost of a hydraulic brake system, it has been economically impractical to achieve a desirable graduation in pressure multiplication by combining several of such units in series.

In addition to overcoming the above problems, it is well established that a booster cylinder, like any device intended for use in a hydraulic brake system, should be free of any tendency to generate or collect air in the system. Air in the brake system causes a springy, rubbery action of the brake pedal, due to its compressibility. Hydraulic pressure in the system will merely compress any bubbles therein instead of applying pressure to the brakes. Absolute cleanliness is also essential when considering parts for hydraulic brake systems. The smallest flake of dirt on the cup seals or in the valves is likely to permit the fluid under high pressure to pass and cause failure of the brakes.

Accordingly, it is an object of the present invention to provide an improved, compact pressure convertor for use in a fluid system which is capable of providing a graduated yet positive shift in fluid pressure in response to changes in fluid pressure delivered thereto.

Another object is to provide an improved brake booster cylinder for delivering and multiplying fluid pressure in progressive stages and which may be easily controlled and readily connected between conventional master and wheel cylinders of existing hydraulic systems.

A further object is to provide a hydraulic booster assembly which is economical in construction and reliable in operation.

A feature of the present invention is the provision of a booster assembly having a multiplicity of concentric differential pistons compactly arranged therein to provide pressure multiplication in stages.

Another feature is the provision of a hydraulic booster assembly in which the non-working as well as the working pressure chambers are filled with fluid to prevent dirt from entering, and in which all the chambers lead upwardly to fluid passages for readily bleeding the assembly of air.

A further feature is the provision of a brake booster cylinder having a surge chamber which serves as a reservoir for the fluid filled non-working chambers and which has a valve means therein for controlling the rate operation of the booster assembly.

In the accompanying drawing, the single figure is an elevational view taken in section along the center longitudinal plane of a hydraulic brake booster assembly embodying the invention.

Briefly, the invention provides a multi-stage pressure converter which is particularly useful when constructed in the form of a brake booster assembly adapted for interconnecting the master cylinder and wheel cylinders of an automotive-type hydraulic brake system. The booster assembly includes a barrel portion sealed by plugs at both ends thereof and having a series of bores stepped therethrough to serve as pressure chambers and cylinders for a reciprocating differential piston subassembly received therein. The piston subassembly includes a pair of concentric double pistons, one within another but separately spring biased to operate individually as well as together. The inner piston has a fluid passage therethrough controlled by a check valve which is operable therein to provide direct fluid communication at low pressures between motor and pump chambers in the barrel portion, but which is closed by forward movement of the pistons in response to higher fluid pressures provided by the operator. Once the valve is closed, the pistons move together to provide one stage of pressure multiplication until forward movement of the outer piston is stopped by a bore shoulder, whereupon the inner piston takes over to provide a further ratio of pressure conversion. A surge chamber is provided above the barrel portion to serve as an air vented fluid reservoir in communication with the non-working chambers in the barrel portion, with a valve therein being operable to control the rate of movement or to lock out the pistons. Inlet and outlet openings, adapted for connection to the brake fluid lines, provide upward fluid communication between the upper portions of the motor and pump chambers and the fluid lines.

Referring in more detail to the accompanying drawing, the pressure convertor of the invention is shown in the form of a brake booster assembly adapted to be connected to the output line from a master cylinder and to a load line leading to wheel cylinders, these elements being conventional and therefore not shown. The booster assembly comprises generally a main body member in the form of casting 1 having a lower barrel portion 2 with a series of co-axial bores 3, 4, 6, 7 and 8 graduated in diameter therethrough. The low pressure end of barrel portion 2 is sealed by an end plug 9 having an external groove carrying an annular seal 11, the seal bearing portion of the plug being slidably received in bore 4. An enlarged flange portion 12 of plug 9 rides in bore 3 and permits limited movement of the plug between a retaining ring 13, sprung into an internal groove of bore 3, and a shoulder 14 formed between bores 3 and 4. The opposite, high pressure end of barrel portion 2 is sealed by another end plug 16. This plug also carries an annular seal 17 in an external groove located between a hexagonal head and an externally threaded sleeve portion 18 of the plug, the latter being adapted for threaded engagement with internal threads 19 of bore 8.

A hollow double piston 21 is slidably received in bores 6 and 7 which serve respectively as cylinders for reciprocating movement of enlarged and reduced bearing portions 22 and 23 of the piston therein. Both of the bearing portions 22 and 23 are externally grooved to carry annular seals 24 and 26 respectively. An annular external shoulder 27 is formed in piston 21 intermediate its bearing portions, shoulder 27 being adapted to butt against an annular stop shoulder 28 formed between bores 6 and 7 to thereby limit forward movement (to the right) of piston 21. A large bore 29 and a smaller co-axial bore 31 are provided in piston 21 which in turn serve as cylinders for another hollow double piston 32 slidably received therein for reciprocating movement relative to piston 21. A forward sleeve portion 33 of inner piston 32 slides in bore 31 past an annular seal 34 carried in an internal groove thereof, while an enlarged bearing portion 36 of piston 32 slides in bore 29. Bearing portion 36 carries another annular seal 37 in an external groove therein, and has an annular shoulder 38 adapted to butt against an internal stop shoulder 39 formed between bores 29 and 31 of outer piston 21 to limit forward movement of piston 32 relative thereto. Fluid or air trapped ahead of shoulder 38 during such movement is fed to bore 6 by means of an internal annular groove 41 which leads to a pair of orifices 42 oppositely disposed in the walls of outer piston 21.

The rearward, retractile movement of outer piston 21 is limited by a perforated washer or spider 43 which is held slidably therein between a retaining ring 44, sprung into a groove in an enlarged bore 46 of piston 21, and an internal shoulder 47 formed by a chamfer between bores 46 and 29. Spider 43 is adapted to butt against a forward portion of end plug 9, this portion being stepped down in diameter so as to be received within retaining ring 44 with fluid passage clearance to the orifices of spider 43 even when outer piston 21 is in its fully retracted position as shown. Fluid communication is thus always maintained between the rear portion of the motor chamber, defined in part by the forward face of plug 9 and bore 4, and a forward portion of the motor chamber defined by bore 29 and the rearward parts of inner piston 32. Part of the forward wall of the motor chamber consists of a cup washer 48 which is carried by an external groove formed in the neck portion of inner piston 32 immediately adjacent enlarged portion 36 thereof. In the fully retracted position of piston 32 within outer piston 21, the neck portion of piston 32 butts against just the inner ring of spider 43. When both pistons are fully retracted, grooves 49 in the rear face of the neck portion of inner piston 32 permit continued fluid communication to a chamfered passageway 51 leading therethrough to the hollow interior of the inner piston.

The hollow interior of inner piston 32 contains a pair of co-axial bores 52 and 53 progressively enlarged in diameter from that of passage 51 and separated from one another by an apertured washer 54 seating against the shoulder formed between the bores. Washer 54 serves as a seat for one end of an elongated compression spring 56 which is received in bore 53 to bias the inner piston. Spring 56 spans bore 7 and is seated at its other end against the inner face of plug 16 in sleeve portion 18. The opposite side of washer 54 serves as a seat for another compression spring 57 which operates in bore 52 to bias a check ball 58 against a valve seat 59 formed by a chamfer between bore 52 and passage 51. When both pistons are fully retracted, the ball is held spaced from the valve seat by a pin 61 embedded in plug 9 and extending therefrom in co-axial registry with passage 51. With the ball check valve open, a straight-through passage exists for fluid communication between the low pressure motor chamber in bore 4 and the high pressure pump chamber in bore 7. The latter bore also houses a compression spring 62 which is held at one end by an annular shoulder 63, formed between bores 7 and 8, and at the other end by another annular shoulder 64 formed in the forward end of outer piston 21. Spring 62 is concentrically spaced from spring 56 so that they operate independently of each other to provide return thrust for pistons 21 and 32 respectively. Of course, the effect of springs 62 and 56 is additive when the inner piston is against spider 43 or stop shoulder 39.

Referring generally to the upper portion of casting 1, a mounting and connecting structure is cast integral with the top of barrel portion 2. A vertical threaded opening 66 is provided at one end of the upper portion adapted for connection thereto of the end of a line (not shown) in which fluid is transmitted between a controlled supply source, such as a master cylinder actuated by a brake pedal, and the top of the low pressure motor chamber in bore 4.

The center of the upper portion of casting 1 is rectangular in shape and is cored out to provide a box-like housing having a mating cover 67 bolted thereto on a peripherally disposed gasket 68 to form a surge chamber 69 therein. The center of cover 67 is adapted to receive the head of a lockout screw 71, with the head carrying an annular seal 72 in an external groove thereof. The lower portion of screw 71 is threadably received in a hollow boss 73 where it plugs the upper end of a vertical passageway 74 formed in the boss, the passageway having a valve seat 75 in a reduced portion thereof adapted to receive a conical bottom end of screw 71 so that the screw is operable as a needle valve. Passageway 74 opens at its lower end into the top of bore 6, while in a portion of passageway 74 above valve seat 75 there is a port 76 through the side of boss 73 to provide fluid communication between the passageway and surge chamber 69. Port 74 may be located at a point above the bottom of the surge chamber but should be well below the fluctuating surface level of the fluid contained therein. The top of chamber 69 is air vented by a breather screw 77 of the type which provides a filtered atmospheric passage to the chamber without loss of fluid splashed thereagainst, and/or by similar venting means provided in the head of screw 71. If the booster assembly is located in a particularly dirty environment, a suitable extended breather tube may be substituted for the breather screw to provide greater filtering action as well as venting to a cleaner environment.

Another vertical threaded opening 78 is provided at the forward end of the upper portion of casting 1, the lower end of which opens into the high pressure pump chamber at the top of bore 7. A bolt 79, having an internally chambered and externally threaded shank 81, is threadably received in opening 78 with an adapter collar 82 and a pair of copper washers 83 clamped between the head of the bolt and the casting. A threaded opening 84 in collar 82 is adapted to threadably receive a conduit or fluid line connected to remote motor cylinders, such as the brake cylinders at each wheel of a vehicle, so that pressure fluid is transmitted from the high pressure chamber through the line to the motor cylinders for operating the same.

The pressure converter of the invention may be advantageously operated as a brake booster cylinder when connected in a conventional automotive hydraulic brake system which is full of suitable brake fluid. When so operated, the above-described elements of the assembly are in the positions shown in the drawing when no pressure is being applied to the brake foot pedal. In this condition, direct fluid communication exists between inlet opening 66 and outlet opening 84 since piston springs 56 and 62 hold both pistons in their fully retracted positions in which pin 61 is effective to hold the ball check valve 58 open. A relatively large volume of fluid, but at low pressure, is normally required to produce the initial and largest movement of the brake shoes from their fully retracted positions into their initial contact with the brake drums. Transfer of such fluid occurs while the pistons are retracted and the check valve is open, with no pressure conversion occurring due to the straight-through fluid communication.

Once the brake shoes touch their drums, added pressure is necessary to move the shoes firmly into the drums. The operator begins to supply this added pressure by increasing his effort on the brake pedal, thereby causing the pressure to rise substantially equally throughout the system. At some predetermined level of pressure the total forward force, resulting from the fluid pressure in the motor chamber of bore 4 acting against the rear working areas of the two pistons, exceeds the combined rearward force, resulting from the same fluid pressure in the pump chamber of bores 7 and 8 acting against the forward working areas of the two pistons plus the force exerted by springs 56 and 62. This net difference in opposite axial forces, resulting from the differential working areas, causes the pistons to "float" forward a distance sufficient to carry valve seat 59 clear of pin 61 and to permit ball 58, biased rearward by spring 57, to seat therein and close the passage. Thereafter the liquid ahead of the forward working areas of the pistons is trapped and floating no longer exists, further forward movement of either piston tending to compress this fluid and producing an attendant rise in pressure in the pump chamber. The ratio of fluid pressure in the low pressure chamber to that in the high pressure chamber becomes equal to the ratio of the rear and front working areas respectively of the pistons. Thus a small pedal pressure is converted into a high brake shoe pressure.

The manner in which this effect is produced by the present booster assembly is determinable by several parameters which may be varied in accordance with the invention as best suits the needs of particular systems. First, of course, there is the straight-through condition in which the booster is passive and the master and wheel cylinders are the sole determining factors. Secondly, there is the differential ratio of total rear motor area to total forward pump area, determined by the ratio of the square of the diameters of bore 6 and 7 respectively, which establishes the pressure conversion ratio when both pistons are moving as a unit, with no relative movement therebetween. Since both the inner and outer pistons 32 and 21 have pressure multiplying ratios when considered separately as well as a unit, it is necessary to adjust the biasing ratio between springs 56 and 62 to insure that the inner piston 32 is initially held against spider 43 so that the pressure conversion is at the ratio of the combined piston areas. Normally, the volume of pressurized liquid displaced by movement of both pistons together to stop shoulder 28 may be utilized to advantage in expanding the brake shoes firmly in their drums, since the concurrent build up in pressure in the second stage is at the ratio of bore 6 to bore 7.

Further pedal pressure may be applied to obtain greater braking power. When fluid pressure in the low pressure motor chamber reaches a predetermined value at which the net forward axial force on inner piston 32 overcomes the rearward bias of spring 56, the inner piston takes over so that pressure conversion is then at the ratio of the effective working areas thereof, that of bore 29 to bore 31. An automatic shift upward in the ratio of pressure conversion is thus obtained. Compound action will then occur, with outer piston 21 retracting slightly to provide a reaction pressure which increases the pressure in the motor chamber, tending to restore equilibrium between the opposite forces on the outer piston while adding to the pressure acting on inner piston 32. Releasing the brake pedal in any of the stages rapidly decreases the fluid pressure in the motor chamber and allows the fluid pressure in the pump chamber to retract both pistons until the ball check valve is opened and direct fluid communication is restored. Springs 56 and 62 complete the retraction of the pistons.

It will thus be seen that a graduated conversion, from an initial 1-to-1 (straight-through) ratio to first, second and compound multiplication ratios, is achieved in automatic shifts by the booster assembly of the invention. This is particularly advantageous when applied to braking systems, as in automobiles, since the unskilled operator will have better control of his vehicle due to the gradual application of pressure to the brake shoes. This is in contrast to the tendency of prior art boosters, which shift in one stage from no conversion to a high order of pressure multiplication, to produce more braking power than is necessary or safe under certain driving conditions. Yet the present multi-piston booster assembly is also capable of reaching high orders of multiplication. It will now be evident that further graduation in pressure conversion may be obtained by providing additional concentric pistons in the assembly should this prove desirable in certain applications.

Another operating characteristic of the pressure converter is that provided by the surge chamber 69 and the co-operating lockout screw 71. Instead of air flowing to and from the non-working chambers in bores 6 and 29 (those chambers ahead of piston bearing portions 22 and 36), brake fluid is provided in this portion of the assembly. This fluid flows from bore 29 through orifices 42 to bore 6, and from bore 6 through vertical passageway 74 and port 76 into the air vented surge chamber 69 when the pistons move forward, and returns in these passages to allow springs 56 and 62 to operate normally in producing retractile movement of the pistons. However, by adjusting the needle valve comprising adjustable lockout screw 71 and valve seat 74, the resistance in the passage may be varied to achieve any desired rate of pressure conversion. If screw 71 is turned all way down when both pistons are in their fully retracted positions, with their respective non-working chambers filled with fluid, the pistons will be locked in their passive positions for straight-through operation of the hydraulic system. Normally, however, the needle valve is left open, and in this condition the surge chamber also serves as a fluid reservoir to accommodate volumetric changes in the fluid due to evaporation and temperature changes. Any dust or dirt which manages to enter through breather screw 77 into the air space above the fluid level in the surge chamber cannot reach the piston cylinders without going into solution with the fluid. It normally will collect as sludge at the bottom of the chamber, below the level of port 76, and this part may be screened to further protect the piston and cylinder surfaces.

The assembly is preferably mounted with the barrel portion of casting 1 in the horizontal position shown, and in this position it is to be noted that every chamber therein leads upwardly to one of the vertical openings or passageways 66, 78, and 74. Hence the assembly is readily bled of air when filling the same with fluid, and thereafter it is self-bleeding, since air or other gas bubbles entrapped or generated in the chambers will escape by rising to the openings which lead from the highest points in the chambers.

Machining operations involved in producing the booster assembly are facilitated by the provision of six of the seven annular seals in external grooves of their respective carrying members. Manufacturing and assembly costs are also reduced by the internal configuration of barrel portion 2, as with no internal grooves therein, the progressively stepped bores may be reamed to their final diameters with a one step form reamer, and the internal parts or subassemblies drop easily in place. The similar arrangement of the bores in the outer and inner pistons also contributes to this result.

I claim:

1. In a brake booster mechanism to be interposed between a master cylinder and the wheel cylinders of a vehicle brake system, an elongate housing having a stepped bore lengthwise thereof adapted to be mounted in a horizontal position, a port to connect the large portion of said stepped bore to said master cylinder and a port to connect the small portion of said stepped bore to the wheel cylinders, a first stepped piston in said stepped bore having portions slidably fitted in said bore for reciprocation therein, a stepped bore within said first piston extending from end to end therein, a second stepped piston in the bore of said first piston having portions slidably engaged in the bore therein adapted for reciprocation in said first piston, said second piston having an axial passage, resilient means to bias said pistons to an at-rest position toward the enlarged ends of said bores and valve means in said second piston to permit the passage of fluid through both of said pistons in said at-rest position, said valve means being closed upon shifting of said second piston away from the at-rest position in a power stroke, and means to limit the motion of said first piston in said stepped bore of said housing wherein pressure from said master cylinder will, in a three-stage development, first, pass through said cylinders, secondly, move both of said pistons toward the small end of the bores in a primary multiplication of master cylinder pressure, and third, move said second piston in a secondary multiplication of pressure.

2. In a brake booster mechanism to be interposed between a master cylinder and the wheel cylinders of a vehicle brake system, an elongate housing having a stepped bore lengthwise thereof adapted to be mounted in a horizontal position, a port to connect the large portion of said stepped bore to said master cylinder and a port to connect the small portion of said stepped bore to the wheel cylinders, a surge chamber above said bore connected to the enlarged portion of said stepped bore adjacent the juncture with said small portion, a first stepped piston in said stepped bore having portions slidably fitted in said bore for reciprocation therein, a stepped bore within said first piston extending from end to end therein, a second stepped piston in the bore of said first piston having portions slidably engaged in the bore therein adapted for reciprocation in said first piston, said second pison having an axial passage, resilient means to bias said pistons to an at-rest position toward the enlarged ends of said bores and valve means in said second piston to permit the passage of fluid through both of said pistons in said at-rest position, said valve means being closed upon shifting of said second piston away from the at-rest position in a power stroke, and means to limit the motion of said first piston in said stepped bore of said housing wherein pressure from said master cylinder will, in a three-stage development, first, pass through said cylinders, secondly, move both of said pistons toward the small end of the bores in a primary multiplication of master cylinder pressure, and third, move said second piston in a secondary multiplication of pressure.

3. A device as defined in claim 2 in which the ports to the master cylinder, the wheel cylinder and the connection to the surge chamber are at the top of said housing as it is mounted in a brake circuit to prevent air accumulation within the mechanism.

4. A device as defined in claim 2 in which breather means is provided in said surge chamber to permit passage of atmospheric pressure thereto.

5. A device as defined in claim 4 in which the breather means is movable to block said surge chamber from said first piston and thus block action of said first piston.

6. A booster assembly for transmitting pressure fluid in a fluid system in multiple pressure stages, including in combination, a motor chamber in fluid communication with a source of actuating fluid, a pump chamber in fluid communication with a load line, first piston means having a pair of differential bearing portions adapted to reciprocate in said motor and pump chambers respectively, said first piston means having first and second chambers therein in fluid communication with said motor and pump chambers respectively, second piston means having a pair of differential bearing portions adapted to reciprocate in said first and second chambers respectively, bias means for urging said first and second piston means into respective retracted positions in said motor and first chambers, valve means operable in the retracted positions of said first and second piston means to communicate said motor chamber with said pump chamber for passage of low pressure fluid therebetween to provide a stage of direct fluid transmission, said valve means being operable at a given fluid pressure in said motor chamber to disconnect said motor and pump chambers whereupon a first of pressure conversion is produced between the source of actuating fluid and the load line, as said first and second piston means move together toward said pump chamber and expel fluid therefrom, and a second stage of pressure conversion results from relative motion between said first and second piston means, with the given fluid pressure and the ratio of pressure conversion in said stages being determined by the respective ratios between said differential bearing portions of said first and second piston means and the amount of retractile force exerted by the bias means.

7. A booster assembly for transmitting pressure fluid in a fluid system in multiple pressure stages, including in combination, a motor chamber in fluid communication with a source of actuating fluid, a pump chamber in fluid communication with a load line, first piston means having a pair of differential bearing portions adapted to reciprocate in said motor and pump chambers respectively, said first piston means having first and second chambers therein in fluid communication with said motor and pump chambers respectively, second piston means having a pair of differential bearing portions adapted to reciprocate in said first and second chambers respectively, bias means for separately urging said first and second piston means into respective retracted positions in said motor and first chambers, said second piston means having check valve means therein, means projecting from said motor chamber into said second piston means to open said check valve means in the retracted position of said first and second piston means to thereby communicate said motor chamber with said pump chamber to provide a stage of direct low pressure fluid transmission, said check valve means being closed as said first and second piston means move from the retracted portion when the pressure in said motor chamber is sufficient to overcome said bias means, whereupon a first stage of pressure conversion is produced between the source of actuating fluid and the load line as said first and second piston means are moved together toward said pump chamber to expel fluid therefrom, with a second stage of pressure conversion resulting from relative motion between said first and second piston means after movement of said first piston means towards said pump chamber is completed, said booster assembly thereby providing graduated ratios of pressure conversion.

8. In a pressure converter adapted for connection into a hydraulic system for operating said converter, the combination including, a barrel portion having a large bore and a small bore axially aligned therein and leading respectively to low and high pressure chambers communicating with inlet and outlet fluid lines of the hydraulic system, first piston means including two head bearing portions of large and small diameter respectively received in said large and small bores of said barrel portion, said first piston means having large and small axially aligned communicating bores therein respectively in communication with the low and high pressure chambers, second piston means including two head bearing portions of large and small diameter respectively received in said large and small bores of said first piston means, said second piston means being movable between predetermined limits in said first piston means and said first piston means being movable between predetermined limits in said barrel portion, valve means for opening communication between said low and high pressure chambers only when both said first and second piston means are biased to their fully retracted limits, with said first and second piston means being biased to their fully retracted limits in said low pressure chamber when said pressure therein is within a low range, said first and second piston means moving together towards said high pressure chamber in response to a middle range of pressure developed in the low pressure chamber and after said first piston means reaches the limit of its movement to thereby further multiply pressure in accordance with the ratio of said bores in said first piston means.

9. In a pressure converter adapted for connection into a hydraulic system for operating said converter, the combination including, a horizontal barrel portion having a large bore and a small bore axially aligned therein, said barrel portion also having low and high pressure chambers, communicating respectively with said large and small bores and leading upwardly for connection with inlet and outlet fluid lines of the hydraulic system, first piston means including bearing portions of large and small diameter repectively received in said large and small bores of said barrel portion, said first piston means having large and small axially aligned communicating bores therein respectively in communication with said low and high pressure chambers, second piston means including bearing portions of large and small diameter respectively received in said large and small bores of said first piston means, said second piston means being movable between predetermined limits in said first piston means and said first piston means being movable between predetermined limits in said barrel portion, spring means for biasing said first and second piston means to fully retracted limits thereof in said low pressure chamber, when said pressure therein is within a low range, valve means in said second piston means for opening communication between said low and high pressure chambers only when both said first and second piston means are biased to the fully retracted limit thereof, a surge chamber disposed above said barrel portion communicating with said large bores of both said barrel portion and said first piston means, said surge chamber receiving non-working fluid trapped ahead of said large diameter bearing portions of said first and second piston means when said first and second piston means move together towards said high pressure chamber in response to a middle range pressure developed in the low pressure chamber and when said second piston means moves alone towards said high pressure chamber in response to a high range of pressure developed in the low pressure chamber and after said first piston means reaches the limit of its movement, said surge chamber having valve means for stopping flow of the non-working fluid to thereby lock said first and second piston means in the fully retracted positions thereof.

10. A booster assembly for use in a hydraulic brake system, including in combination, a body member having a motor chamber therein adapted for connection to a master cylinder and having a pump chamber therein adapted for connection to the hydraulic brakes, said body member also having first and second co-axial cylinders of differential diameter formed therein and opening respectively into said motor and pump chambers, an outer double piston adapted to reciprocate in said cylinders of said body member with a bearing portion thereof fitted in each cylinder, said outer piston having first and second co-axial cylinders of different diameter formed therein and opening respectively to said motor and pump chamber, an inner double piston adapted to reciprocate in said cylinders in said outer piston with a bearing portion thereof fitted in each cylinder, first and second spring means both mounted in said body member to separately retract said outer and inner pistons into said motor chamber but with said first and second spring means cumulatively urging said outer piston towards said motor chamber when said inner piston is fully retracted in said outer piston, said inenr piston having a passageway therethrough opening at its ends to said motor and pump chambers respectively, check valve means operably carried in said passageway and adapted to be closed by initial differential floating movement of said pistons toward said pump chamber so that said pistons thereafter boost pressure in stages when urged by fluid in said motor chamber toward said pump chamber, means for opening said valve means in the fully retracted position of both inner and outer pistons to allow low pressure fluid transfer, said body member further having an air-vented fluid reservoir therein disposed above said cylinders with a fluid passage connecting said reservoir with both of said first cylinders to provide a surge chamber for non-working fluid contained in said first cylinders between said respective bearing portions of said inner and outer double pistons, and screw valve means provided in said fluid passage for adjustably controlling flow of the non-working fluid to thereby control the rate of movement of said pistons.

11. A booster assembly for use in the hydraulic brake system of a vehicle having a master cylinder actuated by brake control means for supplying pressure fluid to remote wheel cylinder means adapted to operate brake means, said booster assembly including in combination, a body member having an elongated horizontal barrel portion with a plurality of communicating co-axial bores stepped in diameter therethrough, first and second plugs each received in one of said bores at each end of said barrel portion to seal off same and to form motor and pump chambers therein said barrel portion having inlet and outlet openings therein, each adapted to receive a fluid line for connection to the master and wheel cylinders respectively and with said inlet and outlet openings respectively entering said motor and pump chambers at the tops thereof for air bleeding the same, a first differential piston having motor and pump bearing portions respectively received in an adjacent pair of said bores for reciprocal movement therein between said motor and pump chambers, said first piston having internal motor and pump cylinders of different diameter therethrough in fluid communication at the opposite ends thereof with said motor and pump chambers, a second differential piston having motor and pump bearing portions respectively received in said motor and pump cylinders of said first piston for reciprocal movement between said motor and pump chambers, said first piston also having a passage connecting the end of said motor cylinder adjacent said pump cylinder with a non-working chamber formed in said barrel portion between said motor and pump portions of said first piston adapted to accommodate fluid trapped between said first and second pistons, said second piston having a fluid passage longitudinally therethrough communicating with said motor and pump chambers, a ball check valve in said passageway tending to close the same when fluid pressure in said pump chamber exceeds that in said motor chamber, first and second spring means respectively for retracting said first and second pistons toward said motor chamber, said first piston having means therein adapted to limit retractile movement of said second piston relative to said first piston and to limit retractile movement of said first piston relative to said barrel portion, said first plug having means adapted to extend into said passageway of said second piston to hold said ball check valve open when said first and second pistons are fully retracted so that the master and wheel cylinders are in fluid communication with one another through said passageway at low pressure, with pressure above the low pressure causing said differential pistons to jointly overcome said first and second spring means and to float together from the fully retracted position thereof until said valve closes whereupon said first and second pistons to produce a first stage of pressure conversion until movement of said first piston towards said pump chamber is stopped by a shoulder formed between said adjacent pair of bores in said barrel portion, said second piston being operable under further pressure to overcome said second spring means to produce a second stage of pressure conversion.

12. A booster assembly as set forth in claim 11 and further including in combination therewith, an upper portion formed in said body member above said barrel portion having a surge chamber therein for storing fluid at atmospheric pressure, a boss portion rising from the top of said barrel portion through said surge chamber and having a passage therein providing fluid communication between said surge chamber and said surge chamber and said non-working chamber in said barrel portion, and a lockout screw threadably received in said boss portion and adapted to control fluid flow through said passage so that the rate of movement of said differential pistons is controlled by adjusting said lockout screw.

13. A booster assembly as set forth in claim 11 in which said end plugs carry sealing means in external grooves thereof, and said motor and pump bearing portions of said first piston and said motor bearing portion of said second piston also carry sealing means in external grooves thereof to thereby facilitate machining operations involved in making said assembly.

14. An adjustable booster assembly for use in a hydraulic brake system, including in combination, a body member having a motor chamber therein adapted for connection to a master cylinder and having a pump chamber therein adapted for connection with the hydraulic brakes, said body member having first and second cylinders formed therein and opening respectively into said motor and pump chambers, double bearing piston means adapted to reciprocate in said cylinders with one bearing portion in each cylinder, spring means mounted to retract said piston means into said motor chamber, means forming a passageway communicating between said motor and pump chambers respectively, check valve means operable in said passageway and adapted to be closed by the fluid pressure in said pump chamber exceeding that in said motor chamber so that said piston means boosts pressure when urged toward said pump chamber, means for opening said check valve means in the fully retracted position of said piston means to allow low pressure fluid transfer, an air-vented liquid reservoir, a fluid passage connecting said reservoir with said first cylinder so that said reservoir provides a surge chamber for non-working liquid contained in said first cylinder between said bearing portions of said piston means, and lockout valve means provided in said fluid passage for adjustably controlling passage of the non-working liquid, said piston means being locked in the fully retracted position thereof by the non-working liquid when said lockout valve means is fully closed so that said booster assembly then transmits fluid without boosting pressure.

References Cited in the file of this patent
UNITED STATES PATENTS

| | | |
|---|---|---|
| 2,191,716 | Hunt | Feb. 27, 1940 |
| 2,351,953 | Goepfrich | June 20, 1944 |
| 2,642,720 | Deardorff | June 23, 1953 |
| 2,666,294 | Porter | Jan. 19, 1954 |